(12) United States Patent
Gustafsson et al.

(10) Patent No.: US 7,948,632 B2
(45) Date of Patent: May 24, 2011

(54) METHOD AND APPARATUS FOR ANALYSIS OF A SAMPLE OF CELLS

(75) Inventors: Mats Gustafsson, Malmö (SE); Mikael Sebesta, Malmö (SE)

(73) Assignee: Phase Holographic Imaging PHI AB, Lund (SE)

( * ) Notice: Subject to any disclaimer, the term of this patent is extended or adjusted under 35 U.S.C. 154(b) by 282 days.

(21) Appl. No.: 12/158,156

(22) PCT Filed: Dec. 22, 2006

(86) PCT No.: PCT/SE2006/050621
§ 371 (c)(1),
(2), (4) Date: Nov. 25, 2008

(87) PCT Pub. No.: WO2007/073345
PCT Pub. Date: Jun. 28, 2007

(65) Prior Publication Data
US 2010/0060897 A1    Mar. 11, 2010

(30) Foreign Application Priority Data

Dec. 22, 2005    (SE) ...................................... 0502859

(51) Int. Cl.
*G01B 9/021* (2006.01)
(52) U.S. Cl. ...................................................... 356/458
(58) Field of Classification Search .................. 356/457, 356/458; 73/656
See application file for complete search history.

(56) References Cited

U.S. PATENT DOCUMENTS 6,943,924 B2 * 9/2005 Marquet et al. .................... 359/9
7,460,240 B2 * 12/2008 Akcakir ........................ 356/457

FOREIGN PATENT DOCUMENTS

JP        2005-141186       6/2005
WO    WO 2005/033679 A1    4/2005

OTHER PUBLICATIONS

Marquet, Pierre et al. "Digital holographic microscopy: a noninvasive contrast imaging technique allowing quantitative visualization of living cells with subwavelength axial accuracy". Optics Letters, vol. 30, No. 5, Mar. 1, 2005, pp. 468-470.*

(Continued)

*Primary Examiner* — Michael A Lyons
(74) *Attorney, Agent, or Firm* — Merchant & Gould P.C.

(57) ABSTRACT

A non-destructive method and device for analyzing a sample comprising transparent living and/or dead cells, by 5 means of a digital holographic microscope, where the sample (8) is exposed to light from a laser (2). The light that travels through the cells in the sample will experience a difference in the optical path length compared to the surrounding media and the wave front that emerges from the 10 cells will thus be phase shifted. This distortion can be detected in the digital hologram, which is reconstructed from the interference pattern detected by a digital sensor (17), such as a CCD or a CMOS, as phase differences or phase shifts and thereby creating a digital hologram. The 15 phase shift of each element of the hologram is then used for analyzing the characteristics of the cells in the sample.

20 Claims, 7 Drawing Sheets

OTHER PUBLICATIONS

Carl et al. "Parameter-optimized digital holographic microscope for high-resolution living-cell analysis." *Applied Optics*. vol. 43. No. 36. 2004. pp. 6536-6544.

Schnars. "Direct phase determination in hologram interferometry with use of digitally recorded holograms." *Jr. of the Optical Society of America*. vol. 11. No. 7. 1994. pp. 2011-2015.

Chinese Office Action for corresponding Chinese Patent Application No. 200680048900.7, mailed Jul. 26, 2010. English translation.

Supplementary European Search Report for corresponding European Patent Application No. 06844041.1-2205/1963927, mailed Jul. 29, 2010.

* cited by examiner

METHOD AND APPARATUS FOR ANALYSIS OF A SAMPLE OF CELLS

AREA OF INVENTION

The present invention relates in general to the field of cell analysis. More particular the invention relates to a method and device for non-destructive analysis and characterization of a sample comprising living or/and dead cells in a cell culture vessel by use of digital holographic microscopy. This is to measure the proliferation and viability of the cells in the sample.

PRIOR ART

To analyse cells, which are almost transparent, they are often dyed or prepared in a certain way to become visual. This approach is unsatisfactory in many aspects, since it may kill a specimen whose life processes are under study. It is also often very time consuming and hence costly such as in determining the number of cells in a cell culture vessel.

Thus, there is a need for a new method for analysing samples without influencing the sample.

Digital holographic (DH) microscopes use the principle of holography to image an object. A laser illuminates the object and the scattered light interferes with the light of a reference source originating from the same laser. The interference pattern may be recorded on a photographic plate or a digital sensor such as a CCD sensor.

Unlike conventional microscopes, such as a phase contrast microscope or a confocal microscope, both phase contrast and amplitude contrast images may be recorded simultaneous in the DH microscope. "Simultaneous amplitude and phase contrast images" means that two images of the object can be recorded in the same hologram, one of these images with an amplitude contrast and the other one with a phase contrast. These images can be analysed each separately or compared one with the other. Their information content may be used to build a computerized three-dimensional image of the object.

Experimental results, which has been disclosed in the article "Parameter-optimized digital holographic microscope for high-resolution living-cell analysis" by D. Carl et al, publ. in APPLIED OPTICS, vol. 43, No. 36, 20 Dec. 2004, shows that digital holographic microscopy allows fast, non-destructive, full field, high-resolution quantitative amplitude and phase-contrast microscopy as well as detection of changes in optical path length in the direction of the interferometer's sensitivity. The disclosed method is used for analyzing cell structures in individual cells.

The problem with prior art is to be able to analyse the characteristics of a large amount of cells and to determine the number of living or/and dead cells in a sample.

Thus, there is a need for a new non-destructive method and device for analysing a sample comprising several cells and to be able to measure the proliferation and viability of cells in the sample.

Hence, an improved method and device would be advantageous and in particular a non-destructive method allowing for increased flexibility and which is less time consuming.

SUMMARY OF THE INVENTION

Accordingly, the present invention preferably seeks to mitigate, alleviate or eliminate one or more of the above-mentioned deficiencies in the art and disadvantages singly or in any combination and solves at least the above mentioned problems by providing a method, a use and a device that analyses a sample comprising transparent living and/or dead cells.

According to one aspect of the invention, there is provided a method for analyzing a sample comprising transparent living and/or dead cells, by means of digital holographic microscopy, where said sample is kept in a cell culture vessel and is exposed to light from a laser, creating a hologram, which comprises at least one matrix element, where said matrix element comprises phase and amplitude information. The method comprises calculating a phase shift of each matrix element in said hologram by using said phase information, determining a focal depth of said cells by use of said amplitude information or combined phase and amplitude information, constructing a phase image of said hologram by using said phase shifts of each matrix element in said hologram. Further the method comprises determining characteristics of said cells in said sample by using said phase image and analyzing a stage of development of said cells by using said characteristics.

Further, the method comprises the steps for determining a volume fraction of living cells in the sample by using the total phase shift. The method may also comprise the steps for analyzing a stage of development of the cells in the volume of living cells by use of the characteristics. The step for analyzing a stage of development of the volume of living cells may comprise recording of at least two holograms, calculating a phase shift of each matrix element, a first phase shift and at least a second phase shift, at at least two occasions at different times and comparing said first phase shift with the at least second phase shift. A phase image may be reconstructed by use of the phase shift and an amplitude image by use of the amplitude information displaying the phase shift in the phase image or the amplitude information in the amplitude image or in a combined phase and amplitude image as different shades of grey or as different colors. The method may also combine the phase image with a phase contrast image collected by a phase contrast microscope. A computer may perform the calculating and analyzing steps.

According to another aspect of the invention, there is provided a device for analyzing a sample comprising transparent living and/or dead cells by means of digital holographic microscopy, where said sample is kept in a cell culture vessel and is exposed to light from a laser, said device comprises means for creating a hologram, which comprises at least one matrix element, said matrix element comprising phase and amplitude information, means for calculating a phase shift of each matrix element in said hologram by using said phase information, means for determining a focal depth of said cells by use of said amplitude information or combined phase and amplitude information and means for constructing a phase image of said hologram comprising means for adding said phase shifts of each matrix element in said hologram. The devices also comprises means for using said phase image for determining the characteristics of said cells in said sample and means for using said characteristics for analyzing a stage of development of said cells. Further the means for determining the characteristics of said cells comprises means for determining the volume of the cell, the size of the cell and the refractive index of the cell.

Further the device may comprise means for determining a volume fraction of living cells and viability in the sample by using the total phase shift. For analyzing a stage of development of the volume of living cells the device may comprise means for recording of at least two holograms, means for calculating a phase shift of each matrix element, a first phase shift and at least a second phase shift, at at least two occasions at different times, means for comparing the first phase shift with the at least second phase shift and means for using said first and second phase shift at different times to determine the proliferation of said cell sample.

The device may comprise means for reconstruction of a phase image, by use of said phase shift or an amplitude image by use of said amplitude information wherein said phase shift or amplitude information may be displayed in said phase image or amplitude image or in a combined phase and amplitude image as different shades of grey or as different colors.

The device may comprise means for combining said phase image with a phase contrast image collected by a phase contrast microscope.

Means for holographic microscopy may also be provided by a set-up, which provides a Fresnel hologram or a Fourier hologram.

According to yet another aspect of the invention, there is provided a use of digital holographic microscopy for the analysis of a sample comprising transparent living and/or dead cells. The analysis may also be for determining a volume fraction of living cells in the sample. Further the analysis may be for analyzing the characteristics of the cells in said sample.

The present invention has the advantages over the prior art that in combination with a resolution comparable to conventional optical microscopes it offers new possibilities for detecting phase changes and variations in the shape of undyed cellular samples comprising living and/or dead cells over time without removing the sample from the cell culture vessel. It is also possible to make the analyzes some time afterward and numerically or even automatically set the proper focal depth. This will simplify and complement the analyzing methods of today.

BRIEF DESCRIPTION OF THE DRAWINGS

Further objects, features and advantages of the invention will become apparent from the following description of several embodiments of the invention with reference to the drawings, in which.

DETAILED DESCRIPTION OF EMBODIMENTS

The following description focuses on an embodiment of the present invention applicable to a device and a method for analyzing a sample of cells without influencing the cells by the use of digital holographic microscopy.

Figure 1:
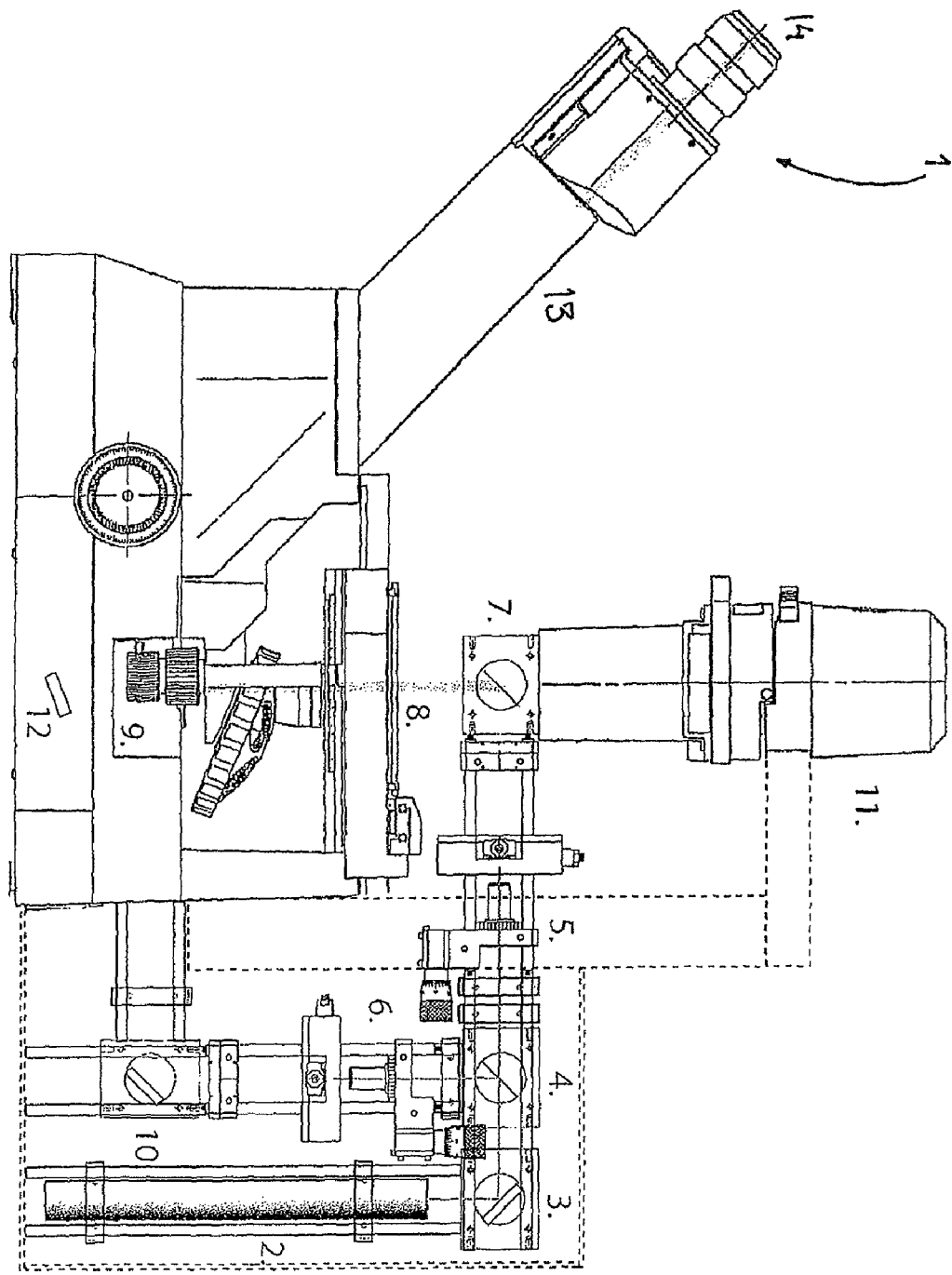
FIG. 1 is a side view of an experimental setup for performing the method according to the invention.

FIG. 1 illustrates an embodiment comprising a phase contrast microscope 1. The embodiment further comprises a laser 2, such as a He—Ne laser, emitting light at a wavelength of 633 nm.

Figure 2:
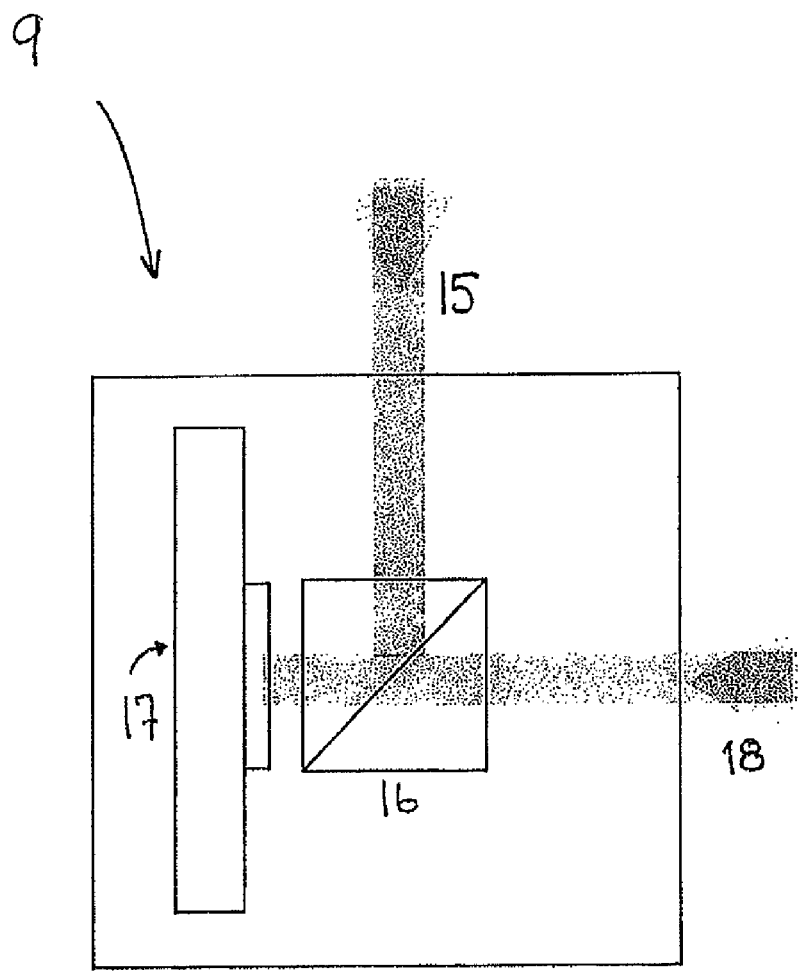
FIG. 2 is an enlarged portion of a part of the interior of the beam collector device ref 9 shown in FIG. 1.

The light beam from the laser 2 is directed via a mirror 3 towards a first beam splitter 4 dividing the beam into an object beam and a reference beam. The object beam passes through a spatial filter 5, towards a second beam splitter 7. A sample 8 is arranged so that the object beam passes through the sample before reaching a beam collector device 9. The reference beam passes through a spatial filter 6 and is then reflected by a mirror 10, which diverts the reference beam towards the beam collector device 9. As shown in FIG. 2, the reference beam 18 and the object beam 15, transmitted through the sample, are combined and interfere with each other at a beam splitter 16 and are collected by a digital sensor 17, such as a CCD or a CMOS, thereby creating a digital hologram. It is also possible to create a phase contrast image at the same time by the use of a digital camera and a light source 11 as well as to obtain an ordinary visual microscopic view through the microscope objective 14.

The device, as shown in FIG. 1, uses a Fresnel holographic setup. The object beam passes the sample 8 before entering a focusing lens system, which focus the diffracted object beam before the beam enters the beam collector device 9. The lens system is used for enlarging the image (in this case the interference pattern).

Figure 3:
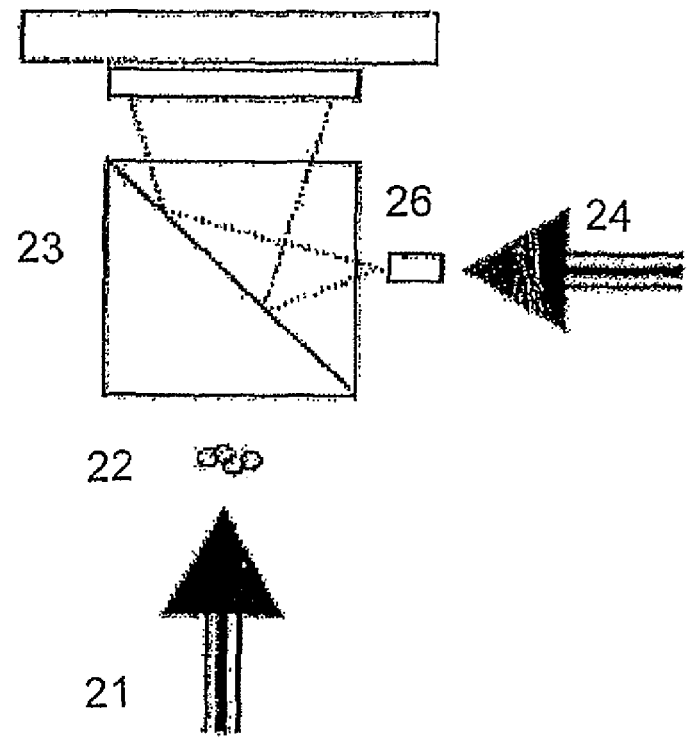
FIG. 3 is a schematic diagram of an experimental setup of Fourier holography equipment for performing the method according to the invention.

It is also possible to use a Fourier holographic setup, which is illustrated in FIG. 3. The object beam 21 passes the object 22 before entering a beam splitter 23. A reference beam 24 passes a lens 26 before it is combined with the diffracted object beam 21 at the beam splitter and collected by a digital sensor 25, such as a CCD or a CMOS, where the digital hologram is created. The lens 26 is used for creating a point source out of the reference beam.

In the method according to the embodiment, it is possible to image transparent objects, such as biological specimens, without any preparations and without removing the sample from the cell culture vessel. In prior art, specimens were routinely stained. This approach was unsatisfactory in many aspects. The stain may, for example, kill a specimen whose life processes may be under study. Further, to be able to analyze a sample it has to be removed from the cell culture vessel and after the analyze is finished the sample is useless.

Samples with cells is placed in cell culture flasks, micro well plates, dishes or tubes. The analyzes may be done without removing the sample from the cell culture vessel, which is an advantage in many cellular applications, since the sample will not be tampered with. It is also possible to take a sample from a culture flask and place it on an object glass.

In the method according to the embodiment a cell culture vessel comprising the sample 8 to be analyzed is arranged at the right position in the phase contrast microscope 1. A single hologram is then obtained of the sample. The hologram comprises information, which may be used for creating a three-dimensional image of the sample.

It is possible to maintain or store the hologram. Consequently an image of the sample may be created and analyzed later on. A computer may be programmed to produce images of the sample, at request.

The hologram is a matrix, which comprises several matrix elements. Each matrix element comprises phase information. This phase information is used for calculating a phase shift of each matrix element. Since the hologram is recorded with a light wave transmitted through a transparent sample, the amplitude contrast is related to changes in absorption and scattering and the phase contrast depends on variations of the thickness and/or of the refractive index inside the sample, or more general on variations in optical path length. Thus, the phase shift in each matrix element depends on two factors, the thickness of the sample and the integral refractive index in that specific element.

Figure 4:
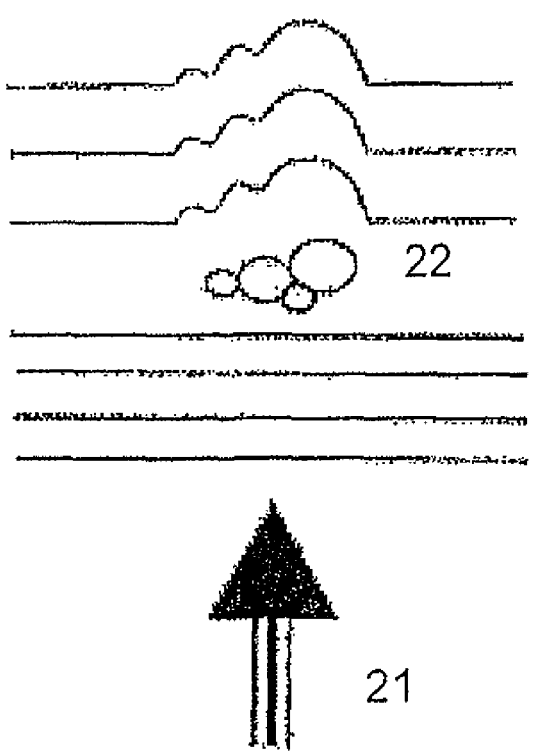
FIG. 4 is a schematic diagram of a sample comprising wave fronts moving beyond the sample.

In one embodiment, a sample with transparent cells such as biological specimens is used. The cells do not substantially absorb any light, but the light that travels through the cells will experience a difference in the optical path length compared to the surrounding media. The wave front that emerges from the cells will thus be phase shifted, which is shown in FIG. 4. This distortion may be detected in the digital hologram, which is reconstructed from the interference pattern detected by a digital sensor 17, such as a CCD or a CMOS, as phase differences or phase shifts. A phase image as well as an amplitude image or a combination may be numerically reconstructed from the digital hologram. The method used for the reconstruction of the hologram could be any common reconstruction process and it will not be explained in detail.

The phase shift of each element in the phase image may then be used for analyzing the characteristics of the cells in the sample. The characteristics of the cells may be the volume and integral refractive index of the cells, which can be used for analyzing at which stage of development the cells are, such as if they are dying or still proliferating.

Since the effective refractive index of dead cells is considered to be almost the same as for the surrounding media, i.e. there will be considerably less phase difference or phase shift compared to a living cell, the dead cells can be detected and discarded from the total phase shift.

The total phase shift is measured repeatedly at different times. The measured values of the total phase shift are analyzed and used for determining the stage of development of the cells in the sample, such as if cells are dying or still are proliferating. This is illustrated in FIGS. 5a and 5b, which are two different phase images from the same sample but at different times T1 (FIGS. 5a) and T2 (FIG. 5b).

Figure 5A:
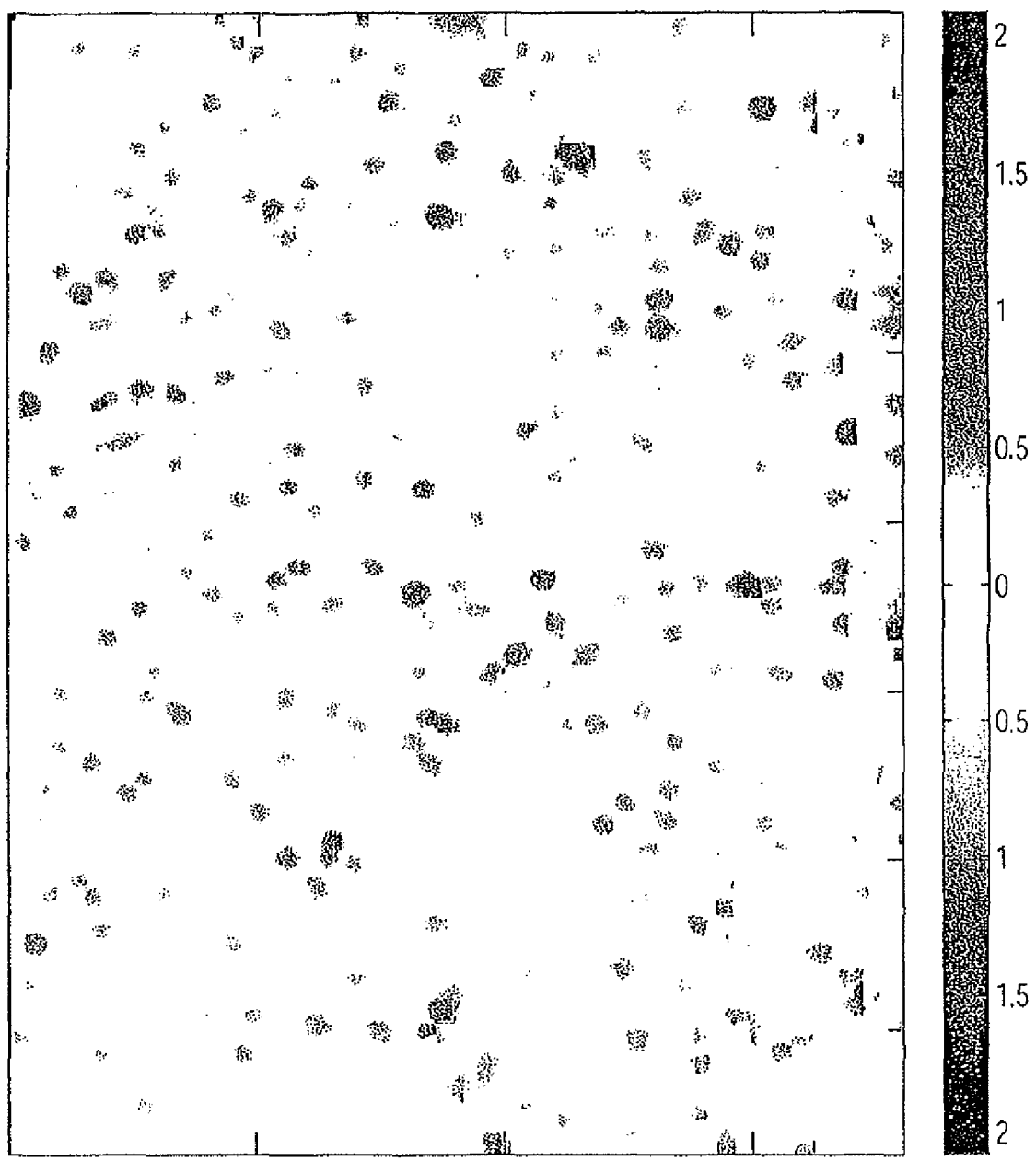
FIG. 5a is a photograph showing a phase image of a sample according to the invention at time T1.
Figure 5B:
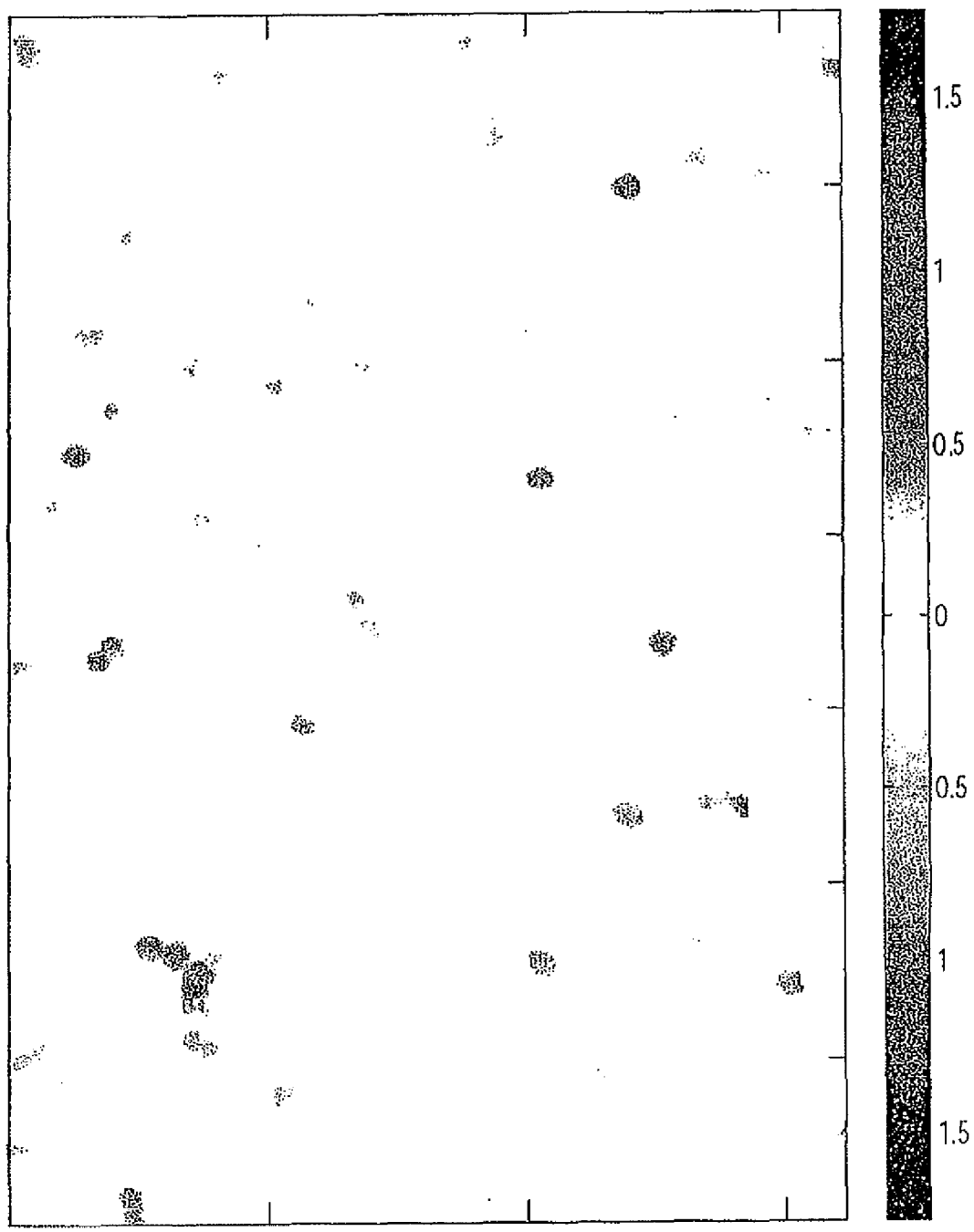
FIG. 5b is a photograph showing a phase image of a sample according to the invention at time T2.

At time T1, living cells are visible as gray or black dots in FIG. 5a. A few cells are visible having a large phase shift, indicated by black dots. This means that the phase shift is large, indicating that the cells have formed spheres with high density and are possibly approaching cell division At time T2, more cells are visible, as indicated by more black and gray dots in FIG. 5b, meaning that there are more living cells in the sample and that the sample has proliferated from time T1 to time T2.

It is also possible to obtain the total number of cells, which are proliferating and dead by visually and manually counting the cell nucleus in an image or automatically by use of a specific software in a computer.

Each pixel in the above mentioned reconstruction of the hologram represents a value of the phase shift of light transmitted through the object in that pixel. This phase shift may be used for creating a phase image. The image may be created by programming a computer to indicate the phase shift, wherein the phase may be displayed in the image for example as different shades of grey or as colors. The computer may also be programmed to determine the number of distinct objects that have a refractive index larger than or smaller than the refractive index of the surrounding medium. The phase image gives a map of the variation of the phase over the sample, and thus, the variation of refractive index or light path length.

Another parameter, which may be used is the area of the cell. Each cell is composed of several pixels in the phase image. The area of each pixel is known, thus the area of the cell may be measured.

Figure 6:
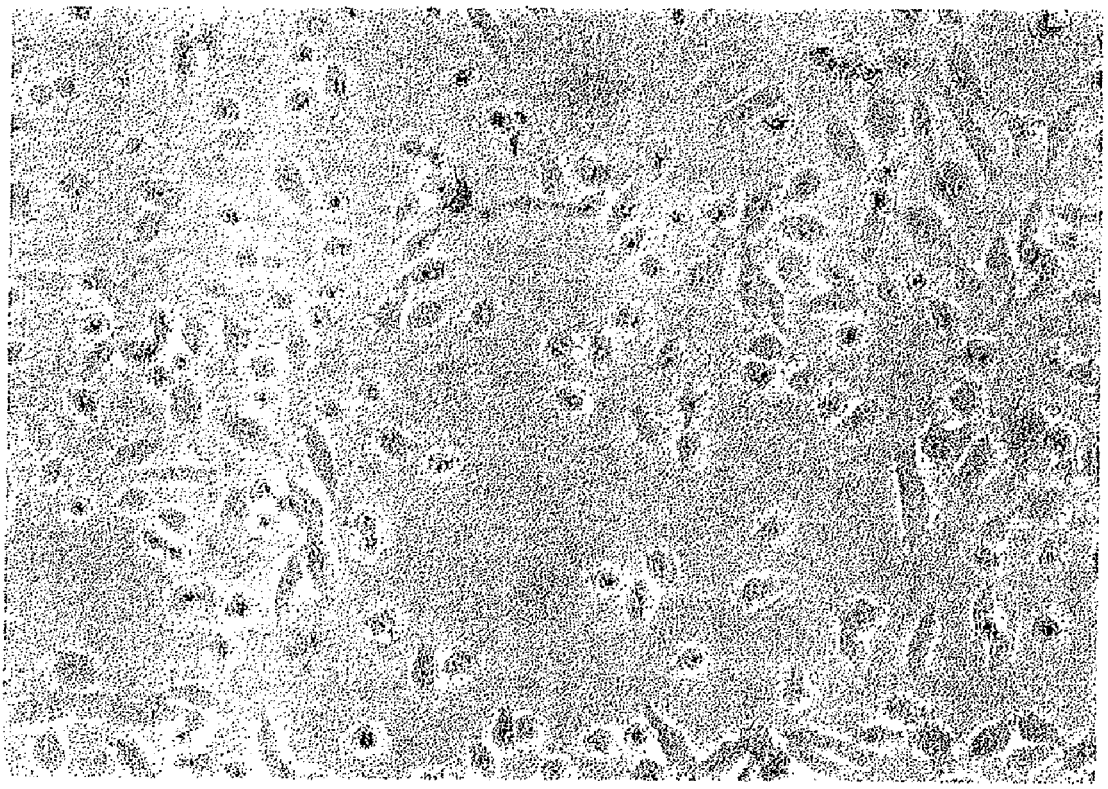
FIG. 6 is a photograph showing a combined phase and phase contrast image according to the invention.

According to the present invention a phase image, reconstructed from the digital hologram, is combined with a phase contrast image collected from a phase contrast microscope. Such an image is shown in FIG. 6. The reason for doing this is to get an image, with an enhanced visualization. The user is familiar with the image, due to the phase contrast image, and an additional dimension is added due to the phase image. The different shades of grey represent the optical density. FIG. 6 shows cells with different characteristics. The cells, which are oblong or pear-shaped grows on the bottom of the cell culture vessel. The cells, which have come off the bottom, forms round spheres with high density. A couple of cells are thinly spread out and has very low density.

Further, it is possible to depict an amplitude image and a phase image of a sample comprising transparent cells. The hologram may be recorded in transmission geometry. Since the sample is transparent the reconstructed amplitude image reveals less details than the phase image, the contrast of which is due to differences in the refractive index and/or thickness of the sample. The living cells make the phase shift and this is visible in the image. In regions in the image where the refractive index is higher (lower) than the surrounding medium the phase decreases (increases).

Furthermore, it is possible to combine a phase image and an amplitude image, which are collected from the same sample simultaneously. This will give further information regarding the characteristic of the cells.

The invention has been described above with reference to a specific embodiment of the invention shown on the drawings. However, a skilled person reading this specification may realize other combinations of the different features indicated in the embodiment, and such other combinations are intended to be within the scope of the invention. The invention is only limited by the appended patent claims.

The invention claimed is:

1. Method for analyzing a sample comprising transparent living and/or dead cells, by means of digital holographic microscopy, where said sample is kept in a cell culture vessel and is exposed to light from a laser, comprising the steps of:
   (I) creating a first hologram at a first point in time, which comprises at least one matrix element, where said matrix element comprises phase and amplitude information;
   (II) calculating a phase shift of each matrix element in said first hologram by using said phase information;
   (III) determining a focal depth of said cells by use of said amplitude information or combined phase and amplitude information;
   (IV) constructing a first phase image of said first hologram by using said phase shifts of each matrix element in said first hologram, and
   analyzing the amount of phase shift in at least one pixel of said first phase image to determine the stage of development of a cell in said sample corresponding to said at least one pixel in said first phase image.

2. The method as claimed in claim 1, wherein said calculating, constructing, determining and analyzing are performed by a computer.

3. The method according to claim 1, further comprising determining a volume fraction of living cells in said sample by using said first phase image.

4. The method according to claim 1, further comprising determining the volume, the size, or the refractive index of a cell in said sample.

5. The method according to claim 4, further comprising determining the number of cells in said sample based on said first phase image.

6. The method according to claim 1, further comprising constructing a second phase image by repeating the steps of (I) creating, (II) calculating, (III) determining, and (IV) constructing, wherein said repeated step of (I) creating is performed at a second point in time, and comparing the phase shift in said first phase image with the phase shift in said second phase image to determine the proliferation of cells in said cell sample.

7. The method according to claim 1, further comprising reconstructing a phase image by use of said phase shift and an amplitude image by use of said amplitude information displaying said phase shift in said phase image or said amplitude information in said amplitude image or in a combined phase and amplitude image as different shades of grey or as different colors.

8. The method according to claim 7, further comprising combining said phase image with a phase contrast image collected by a phase contrast microscope.

9. Use of the method according to claim 1 for differentiating living, proliferating, dying, or dead cells in a cell sample.

10. The use according to claim 9 for determining a fraction of living cells in said sample.

11. The method according to claim 1, further comprising determining a viability of living cells in said sample by using said first phase image.

12. A device for analyzing a sample comprising transparent living and/or dead cells by means of digital holographic microscopy, where said sample is kept in a cell culture vessel and is exposed to light from a laser, said device comprising
means for creating a first hologram at a first point in time, which comprises at least one matrix element, said matrix element comprising phase and amplitude information;
means for calculating a phase shift of each matrix element in said first hologram by using said phase information;
means for determining a focal depth of said cells by use of said amplitude information or combined phase and amplitude information;
means for constructing a first phase image of said first hologram by using said phase shifts of each matrix element in said first hologram, and
means for analyzing the amount of phase shift in at least one pixel of said first phase image to determine the stage of development of a cell in said sample corresponding to said at least one pixel in said first phase image.

13. The device according to claim 12, further comprising means for determining a volume fraction of living cells in said sample by using said first phase image.

14. The device according to claim 13, said device comprising means for analyzing a stage of development of said cells in said volume fraction of living cells based on said first phase image.

15. The device according to claim 13, further comprising means for analyzing a stage of development of said volume of living cells comprising means for constructing a second phase image by utilizing the means for creating, means for calculating, and means for determining, by using said phase shifts of each matrix element in a second hologram wherein said second hologram is created at a second point in time, and
means for comparing the phase shift in said first phase image with the phase shift in said second phase image to determine the proliferation of cells in said cell sample.

16. The device according to claim 15, further comprising means for combining said phase image with a phase contrast image collected by a phase contrast microscope.

17. The device according to claim 12, further comprising means for determining the volume, the size, or the refractive index of a cell in said sample.

18. The device according to claim 12, further comprising means for reconstruction of a phase image by use of said phase shift or an amplitude image by use of said amplitude information wherein said phase shift or amplitude information may be displayed in said phase image or amplitude image or in a combined phase and amplitude image as different shades of grey or as different colors.

19. The device according to claim 12, further comprising means for holographic microscopy provided by a set-up which provides a Fresnel hologram or a Fourier hologram.

20. The device according to claim 12, further comprising means for determining viability of living cells in said sample by using said first phase image.

* * * * *